(12) United States Patent
Kan (10) Patent No.: US 11,662,697 B2
(45) Date of Patent: May 30, 2023

(54) EQUIPMENT REGULATION METHOD AND EQUIPMENT REGULATION DEVICE

(71) Applicant: BOE TECHNOLOGY GROUP CO., LTD., Beijing (CN)

(72) Inventor: Xuefeng Kan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 948 days.

(21) Appl. No.: 16/318,022

(22) PCT Filed: May 15, 2018

(86) PCT No.: PCT/CN2018/086814
§ 371 (c)(1),
(2) Date: Jan. 15, 2019

(87) PCT Pub. No.: WO2019/037477
PCT Pub. Date: Feb. 28, 2019

(65) Prior Publication Data
US 2021/0356919 A1    Nov. 18, 2021

(30) Foreign Application Priority Data
Aug. 22, 2017 (CN) .......................... 201710724222.1

(51) Int. Cl.
*G05B 13/04* (2006.01)
*G01P 5/00* (2006.01)
(Continued)

(52) U.S. Cl.
CPC ............ *G05B 13/042* (2013.01); *G01P 5/001* (2013.01); *F24F 11/64* (2018.01); *F24F 2120/10* (2018.01); *G06Q 10/0631* (2013.01)

(58) Field of Classification Search
CPC .... G05B 13/042; G01P 5/001; F24F 2120/10; F24F 11/64; G06Q 10/0631; G06T 17/00; G06K 9/00771
See application file for complete search history.

(56) References Cited

U.S. PATENT DOCUMENTS

| 5,436,852 A | * | 7/1995 | Kon | .......................... G01W 1/17 236/91 C |
| 6,439,469 B1 | * | 8/2002 | Gruber | .................. G05B 13/048 236/78 D |

(Continued)

FOREIGN PATENT DOCUMENTS

CN    103389710 A    11/2013
CN    103778702 A     5/2014
(Continued)

OTHER PUBLICATIONS

Rahmati, B., Heidarian, A. and Jadidi, A.M., Investigation in performance of a hybrid personalized ventilation (PV) with underfloor air distribution (UFAD) system; The 26th Annual Int. Conference of Iranian Society of Mechanical Engineers-ISME2018 Apr. 24-26, 2018, School of Mech. Eng, Iran. (Year: 2018).*

(Continued)

*Primary Examiner* — Alicia M. Choi
(74) *Attorney, Agent, or Firm* — Collard & Roe, P.C.

(57) ABSTRACT

An equipment regulation method is disclosed. The equipment regulation method includes: collecting first environmental data of current environment in a space; determining an environment scene state of the current environment in the space according to the first environmental data; and controlling one or more equipment in the space according to the environment scene state of the space. An equipment regulation device is further provided.

16 Claims, 5 Drawing Sheets

(51) Int. Cl.
F24F 120/10 (2018.01)
F24F 11/64 (2018.01)
G06Q 10/0631 (2023.01)

(56) References Cited

U.S. PATENT DOCUMENTS

| | | | | |
|---|---|---|---|---|
| 2006/0107670 | A1* | 5/2006 | Thomle | F24F 11/0001 236/51 |
| 2011/0096630 | A1* | 4/2011 | Park | G01S 7/52004 367/99 |
| 2011/0307208 | A1* | 12/2011 | Graf | G01D 3/0365 702/104 |
| 2012/0143516 | A1* | 6/2012 | Mezic | G05B 15/02 702/24 |
| 2013/0197678 | A1 | 8/2013 | Ara et al. | |
| 2014/0027103 | A1* | 1/2014 | Strelec | F24F 11/62 165/239 |
| 2015/0212119 | A1* | 7/2015 | Mezic | G05B 15/02 702/60 |
| 2017/0083823 | A1* | 3/2017 | Shen | G06F 17/18 |
| 2017/0185057 | A1* | 6/2017 | Ashdown | G06F 30/13 |
| 2019/0078801 | A1* | 3/2019 | Turney | G05D 23/1917 |
| 2019/0368762 | A1* | 12/2019 | Kim | F24F 11/65 |
| 2020/0041965 | A1* | 2/2020 | Patel | F28D 20/0034 |

FOREIGN PATENT DOCUMENTS

| | | | |
|---|---|---|---|
| CN | 104279727 | A | 1/2015 |
| CN | 104714504 | A | 6/2015 |
| CN | 105119998 | A | 12/2015 |
| CN | 105573366 | A | 5/2016 |
| CN | 205281554 | U | 6/2016 |
| CN | 105763648 | A | 7/2016 |
| CN | 103645696 | B | 2/2017 |
| CN | 106407651 | A | 2/2017 |
| CN | 106440277 | A | 2/2017 |
| CN | 106453630 | A | 2/2017 |
| CN | 106534391 | A | 3/2017 |
| CN | 206147753 | U | 5/2017 |
| CN | 106851935 | A | 6/2017 |
| CN | 106980266 | A | 7/2017 |
| CN | 106980270 | A | 7/2017 |
| JP | 2017075731 | A | 4/2017 |
| WO | 2011/145312 | A1 | 11/2011 |
| WO | WO 2014/097072 | A1 * | 6/2014 ............ H04L 12/28 |
| WO | 2017199282 | A1 | 11/2017 |

OTHER PUBLICATIONS

Mishra, A.A. and Iaccarino, G., 2017. RANS predictions for high-speed flows using enveloping models. arXiv preprint arXiv: 1704.01699, Center for Turbulence Research Annual Research Briefs 2016. (Year: 2016).*
Chen, Z., Masood, M.K. and Soh, Y.C., 2016. A fusion framework for occupancy estimation in office buildings based on environmental sensor data. Energy and Buildings, 133, pp. 790-798. (Year: 2016).*
Jin, Q., Li, X., Duanmu, L., Shu, H., Sun, Y. and Ding, Q., 2012. Predictive model of local and overall thermal sensations for non-uniform environments. Building and Environment, 51, pp. 330-344. (Year: 2012).*
Chinese Office Action in Chinese Application No. 201710724222.1, dated Apr. 1, 2020 with English translation.
International Search Report of PCT/CN2018/086814 in Chinese, dated Jul. 27, 2018, with English translation.
Notice of Transmittal of the International Search Report of PCT/CN2018/086814 in Chinese, dated Jul. 27, 2018.
Written Opinion of the International Searching Authority of PCT/CN2018/086814 in Chinese, dated Jul. 27, 2018 with English translation.

* cited by examiner

EQUIPMENT REGULATION METHOD AND EQUIPMENT REGULATION DEVICE

CROSS REFERENCE TO RELATED APPLICATIONS

This application is the National Stage of PCT/CN2018/086814 filed on May 15, 2018, which claims priority under 35 U.S.C. § 119 of Chinese Application No. 201710724222.1 filed on Aug. 22, 2017, the disclosure of which is incorporated by reference.

TECHNICAL FIELD

Embodiments of the present disclosure relates to an equipment regulation method and an equipment regulation device.

BACKGROUND

At present, technologies to control equipment based on the internet of things are developing rapidly. The internet of things technology can be applied in many spaces, for example, a conference room, a cold storage, a file room, and so on. In many cases, the environment scene states of the spaces need to be determined, for example, whether or not a human is in the space, and then the equipment in the space are controlled according to a determination result, such that various needs are met.

Conventional devices to determine the environment scene state in the space include sonar positioning devices, infrared monitoring devices and human thermal energy monitoring devices. However, the use of the sonar positioning devices and the infrared monitoring devices are relatively limited such that the changes of the overall environment cannot be effectively detected, while the cost of the human thermal energy monitoring devices is relatively high.

SUMMARY

At least one embodiment of the present disclosure provides an equipment regulation method, which comprises: collecting first environmental data of current environment in a space; determining an environment scene state of the current environment in the space according to the first environmental data; controlling one or more equipment in the space according to the environment scene state of the space.

For example, the equipment regulation method provided by an embodiment of the present disclosure further comprises: collecting second environmental data of the space at different environment scene states; and obtaining a plurality of second eigenvalue parameters of the space at different environment scene states according to the second environmental data.

For example, in the equipment regulation method provided by an embodiment of the present disclosure, determining the environment scene state of the current environment in the space according to the first environmental data comprises: obtaining a first eigenvalue parameter according to the first environmental data; and determining the environment scene state of the current environment in the space by comparing the first eigenvalue parameter and the plurality of second eigenvalue parameters.

For example, the equipment regulation method provided by an embodiment of the present disclosure further comprises: determining whether or not the second environmental data of the space is changed; and updating the plurality of second eigenvalue parameters according to the second environmental data in a case that the second environmental data of the space is changed.

For example, in the equipment regulation method provided by an embodiment of the present disclosure, obtaining the plurality of second eigenvalue parameters of the space at different environment scene states according to the second environmental data comprises: performing data modeling on the second environmental data to obtain a mathematical model; and obtaining the plurality of second eigenvalue parameters according to the mathematical model. Obtaining the first eigenvalue parameter according to the first environmental data comprises: calculating the first environmental data according to the mathematical model to obtain the first eigenvalue parameter.

For example, in the equipment regulation method provided by an embodiment of the present disclosure, performing data modeling on the second environmental data to obtain the mathematical model comprises: discretizing a plurality of parameters of the second environmental data along the space and time; determining corresponding relationships between the plurality of parameters which are discretized; and calculating the plurality of parameters of the second environmental data according to the corresponding relationships.

For example, in the equipment regulation method provided by an embodiment of the present disclosure, the mathematical model comprises: $\mu=0.03874\rho vl$; in which $\mu$ is a turbulence viscosity coefficient, $\rho$ is an air density, $v$ is an air flow velocity; and $l$ is a minimum distance between an inner surface of the space and a position at which the first environmental data or the second environmental data are collected.

For example, in the equipment regulation method provided by an embodiment of the present disclosure, determining the environment scene state of the current environment in the space according to the first environmental data further comprises: determining whether or not the environment scene state of the current environment in the space is changed, and generating a state change signal in a case that the environment scene state of the current environment in the space is changed. Controlling the equipment in the space according to the environment scene state of the space comprises: transmitting the state change signal to the equipment in the space to control the equipment to perform a state change.

For example, in the equipment regulation method provided by an embodiment of the present disclosure, in a case that the environment scene state of the current environment in the space is changed, if the environment scene state is changed from a state that no one exists in the space into a state that someone exists in the space, stopping the determining the environment scene state of the current environment in the space, and restarting the determination after waiting for a first time interval; and if the environment scene state is changed from the state that someone exists in the space into the state that no one exists in the space, continuing the determining of the environment scene state of the current environment in the space.

For example, in the equipment regulation method provided by an embodiment of the present disclosure, the first environmental data or the second environmental data comprises air flow state data.

For example, in the equipment regulation method provided by an embodiment of the present disclosure, the air flow state data comprise air density data, air flow velocity data and distance data.

For example, in the equipment regulation method provided by an embodiment of the present disclosure, the first eigenvalue parameter or the second eigenvalue parameters each comprises a turbulence viscosity coefficient.

For example, in the equipment regulation method provided by an embodiment of the present disclosure, the environment scene state comprises a state that someone exists in the space and a state that no one exists in the space.

For example, in the equipment regulation method provided by an embodiment of the present disclosure, the space comprises a conference room, a safe, a cold storage or a file room.

At least one embodiment of the present disclosure provides an equipment regulation device, which comprises: a data collecting unit configured to collect first environmental data of current environment in a space; a processing unit configured to determine an environment scene state of the current environment in the space according to the first environmental data; and a control unit configured to control one or more equipment in the space according to the environment scene state of the space.

For example, in the equipment regulation device provided by an embodiment of the present disclosure, the data collecting unit is further configured to collect second environmental data of the space at different environment scene states according to a first frequency; and the processing unit is further configured to obtain a plurality of second eigenvalue parameters of the space at different environment scene states according to the second environmental data.

For example, in the equipment regulation device provided by an embodiment of the present disclosure, the processing unit is further configured to obtain a first eigenvalue parameter according to the first environmental data, and to determine the environment scene state of the current environment in the space by comparing the first eigenvalue parameter and the plurality of second eigenvalue parameters.

For example, in the equipment regulation device provided by an embodiment of the present disclosure, the processing unit is further configured to determine whether or not the second environmental data of the space is changed, and to update the plurality of second eigenvalue parameters according to the second environmental data in a case that the second environmental data is changed.

For example, in the equipment regulation device provided by an embodiment of the present disclosure, the processing unit comprises a model calculation unit and a calculation-determination unit. The model calculation unit is configured to perform data modeling according to the second environmental data to obtain a mathematical model, and to obtain the plurality of second eigenvalue parameters of the space at different environment scene states according to the mathematical model, and to store the plurality of second eigenvalue parameters in the calculation-determination unit. The calculation-determination unit is configured to calculate the first environmental data according to the mathematical model to obtain the first eigenvalue parameter, and to determine the environment scene state of the current environment in the space by comparing the first eigenvalue parameter and the plurality of second eigenvalue parameters.

For example, in the equipment regulation device provided by an embodiment of the present disclosure, the mathematical model comprises: $\mu=0.03874\rho v l$; in which $\mu$ is a turbulence viscosity coefficient, $\rho$ is an air density, $v$ is an air flow velocity; and $l$ is a minimum distance between the data collecting unit and an inner surface of the space.

For example, the equipment regulation device provided by an embodiment of the present disclosure further comprises a data transmission unit. The processing unit is further configured to determine whether or not the environment scene state of the current environment in the space is changed, and to generate a state change signal in a case that the environment scene state of the current environment in the space is changed; and the data transmission unit is configured to transmit the state change signal to the control unit, so as to allow the control unit to control the equipment in the space to perform a state change according to the state change signal.

For example, in the equipment regulation device provided by an embodiment of the present disclosure, in a case that the processing unit determines that the environment scene state of the current environment in the space is changed, if the environment scene state is changed from a state that no one exists in the space into a state that someone exists in the space, the processing unit stops determining the environment scene state of the current environment in the space, and restarts determination after waiting for a first time interval; and if the environment scene state is changed from the state that someone exists in the space into the state that no one exists in the space, the processing unit continues to determine the environment scene state of the current environment in the space.

For example, in the equipment regulation device provided by an embodiment of the present disclosure, the model calculation unit and the calculation-determination unit are integrated in a single device.

For example, in the equipment regulation device provided by an embodiment of the present disclosure, the equipment comprises at least one of a lamp, an air conditioner, a projector, a television, a writing board, or a video conference equipment.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At least one embodiment of the present disclosure provides an equipment regulation method, which includes: collecting first environmental data of current environment in a space; determining an environment scene state of the current environment in the space according to the first environmental data; controlling one or more equipment in the space according to the environment scene state of the space. At least one embodiment of the present disclosure further provides an equipment regulation device corresponding to the above-mentioned equipment regulation method.

The equipment regulation method and the equipment regulation device provided by the embodiments of the present disclosure can control the state of the equipment in the space according to current environment scene state in the space, such that electrical energy can be saved, waste of resources can be reduced, and safety factor can be improved.

The embodiments of the present disclosure are described in detail in the following with reference to the accompany drawings.

Figure 1:
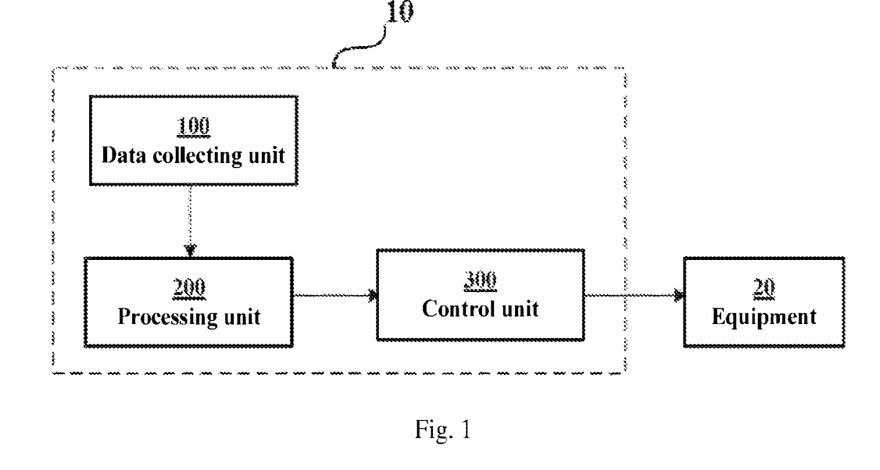
FIG. 1 is a schematic block diagram of an equipment regulation device provided by an example of an embodiment of the present disclosure.

An example of the embodiments of the present disclosure provides an equipment regulation device 10, as illustrated in FIG. 1, the equipment regulation device 10 includes: a data collecting unit 100 configured to collect first environmental data of current environment in a space, a processing unit 200 configured to determine an environment scene state of the current environment in the space according to the first environmental data, and a control unit 300 configured to control one or more equipment 20 in the space according to the environment scene state of the space.

For example, the equipment regulation device 10 can be applied in spaces such as a conference room, a safe, a cold storage or a file room, and the embodiments of the present disclosure include the above-mentioned cases but are not limited to the above-mentioned cases, the equipment regulation device 10 provided by the embodiments of the disclosure can also be applied in any space, as long as the internal environment scene state of the space needs to be detected and equipment in the space needs to be controlled according to the environment scene state. Furthermore, the space in the embodiments of the present disclosure includes an enclosed space and an unclosed space, and no limitation will be given to the embodiments of the present disclosure in this respect. All the following embodiments are described by taking the case where the space is a conference room as an example, and no further descriptions will be given here.

For example, the first environmental data can include air flow state data. For example, the environment scene state can include a state that someone exists in the space and a state that no one exists in the space, in which the state that no one exists in the space can further include a state that an air conditioner is turned on while no one exists in the space and a state that the air conditioner is turned off while no one exists in the space.

For example, in the case that the equipment regulation device 10 is applied in the conference room, the equipment 20 can be at least one of a lamp, an air conditioner, a projector, a television, a writing board or a video conference equipment. It should be noted that, the embodiments of the present disclosure include the above-mentioned cases but are not limited to the above-mentioned cases. For example, if the equipment regulation device 10 is applied in other application scenarios, for example, a file room, the equipment 20 controlled by the equipment regulation device 10 is correspondingly the equipment which is in the file room and needs to be controlled.

Figure 2:
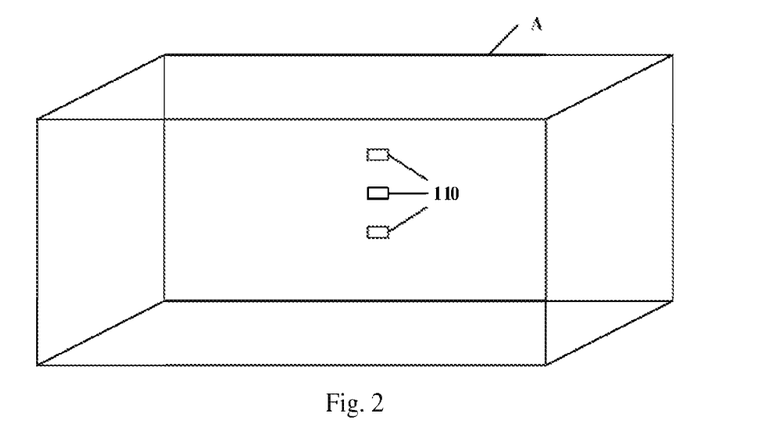
FIG. 2 is a first schematic diagram illustrating a setting position, in a space, of a sensor in an embodiment of the present disclosure.
Figure 3:
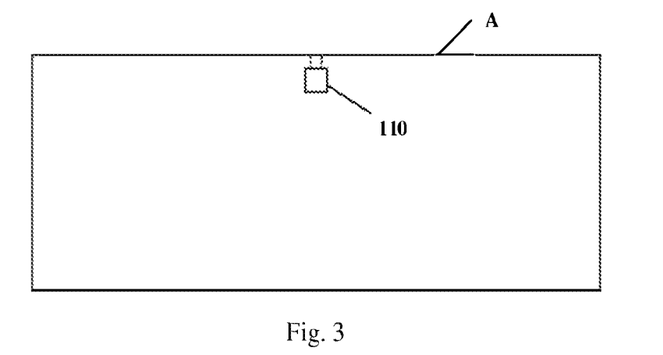
FIG. 3 is a second schematic diagram illustrating a setting position, in a space, of a sensor in an embodiment of the present disclosure.

For example, as illustrated in FIG. 2 and FIG. 3 (FIG. 2 is a three-dimensional perspective of the space of the conference room, FIG. 3 is a top view of FIG. 2), the data collecting unit 100 can include at least one sensor 110. FIG. 2 illustrates three sensors 110 (because FIG. 3 is a top view, only one sensor 110 is illustrated in FIG. 3), and the embodiments of the present disclosure include the above-mentioned case but are not limited to the above-mentioned case, the data collecting unit 100 can include four, five or more sensors 110.

For example, as illustrated in FIG. 2 and FIG. 3, the sensors 110 are provided on the wall A of the conference room, and the embodiments of the present disclosure include the above-mentioned case but are not limited to the above-mentioned case. For example, the sensors 110 can also be provided on other walls of the conference room. For example, as illustrated in FIG. 2, the sensors 110 are set to allow the distances, between adjacent sensors 110 in the direction perpendicular to the horizontal plane, to be the same, and to avoid the sensors 110 from being in a region near to the ground or ceiling; by this way, the differences between the air flow state data which are collected by three sensors 110 in the conference room are small, and therefore, the accuracy of the collected data can be improved by averaging the data. For example, as illustrated in FIG. 3, the sensors 110 can be fixed to the wall A by other connecting parts in the way that there is a distance between the sensors 110 and the wall A, and compared with the case where the sensors 110 are attached to the wall A, the air flow state data which are collected by three sensors 110 in the conference room are more effective.

Figure 4:
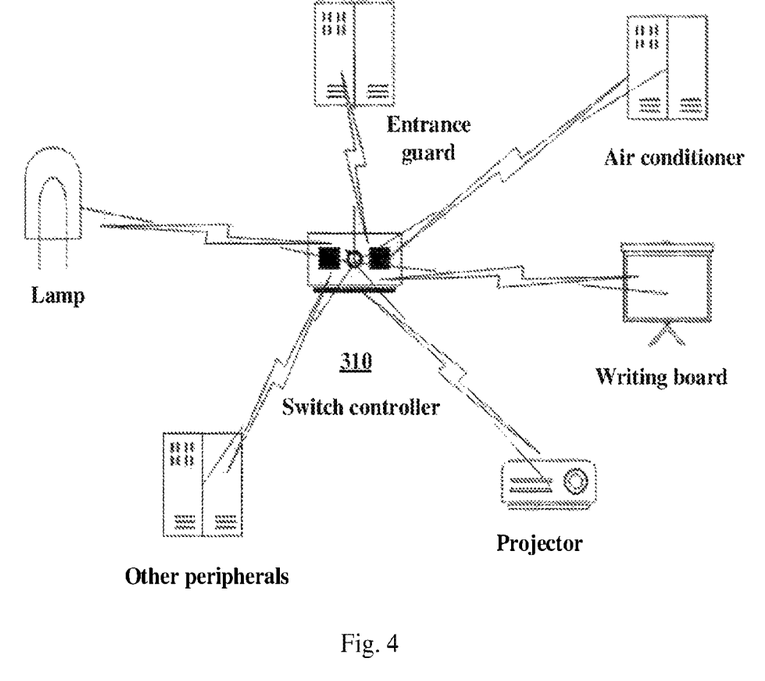
FIG. 4 is a schematic diagram illustrating controlling of equipment in an space by a switch controller.

For example, as illustrated in FIG. 4, in some examples, the control unit 300 can be implemented as a switch controller 310, and the switch controller 310 can control equipment in the conference room according to the environment scene state in the conference room. FIG. 4 illustrates a plurality of equipment in the conference room, and the embodiments of the present disclosure include the above-mentioned case but are not limited to the above-mentioned case. For example, the turning on and turning off of the equipment in the conference room can be controlled by radio frequency identification (RFID) technology. For example, each of the equipment to be controlled is provided with a RFID chip, and the switch controller 310 can control the turning on and turning off of each of the equipment by emitting a radio frequency signal.

It should be noted that, the control unit 300 can also be implemented as other controller or other control circuit other than the switch controller 310, and no limitation will be given to the embodiments of the present disclosure in this respect.

For example, in the case that the equipment regulation device 10 is applied in the conference room, if the processing unit 200 determines that the current environment scene state of the conference room is the state that no one exists in the space, the control unit 300 can control the equipment in the conference room to allow the equipment to be turned off. For example, the control unit 300 can control the lamp, the air conditioner, the projector, the television, the writing board and the video conference equipment and so on to allow the above-mentioned equipment to be turned off. Apparently, one or more equipment in the above-mentioned equipment can already be turned off, and the equipment can be unresponsive in this case. For example, if the processing unit 200 determines that the current environment scene state of the conference room is the state that someone exists in the space, the control unit 300 can control the equipment in the conference room to allow the equipment to be turned on.

In the embodiments of the present disclosure, by providing the equipment regulation device in a space, the operation state of the equipment in the space can be controlled according to the environment scene state in the space, and therefore, electrical energy can be saved, waste of resources can be reduced, and safety factor can be improved.

For example, in some examples of the embodiments of the present disclosure, the data collecting unit 100 is further configured to collect second environmental data of the conference room at different environment scene states according to a first frequency. For example, the first frequency can include 1 Hz, 5 Hz, 10 Hz, 20 Hz or 50 Hz, the embodiments of the present disclosure include the above-mentioned cases but are not limited to the above-mentioned cases, and the first frequency can be specifically set according to actual implementations. For example, the second environmental data can also be the air flow state data, just like the first environmental data.

It should be noted that, in the embodiments of the present disclosure, the first environmental data represent current environmental data in the conference room, that is to say, the first environmental data only include the environmental data under the current environment scene state. The second environmental data represent the environmental data of the conference room under different environment scene states at different times, that is to say, the second environmental data include the environmental data under a plurality of different environment scene states.

For example, the data collecting unit 100 can continue to collect data according to the first frequency which is preset, the environmental data, which are collected at the current moment, of the conference room are referred to as the first environmental data, and the first environmental data is changed along with the time at which the data are collected. The environmental data, which are collected at different times and during the conference room being in different environment scene states, are referred to as the second environmental data. In the case that the environmental arrangement of the conference room is not changed, after prolonged data collecting, the environmental data of the second environmental data under each of the environment scene states can be stabilized within a certain numerical range, that is to say, the second environmental data include a plurality of environmental data ranges, and each of the environmental data ranges corresponds to one of the environment scene states. For example, the environment scene states of the conference room are changed among the state that someone exists in the space, the state that the air conditioner is turned on while no one exists in the space, and the state that the air conditioner is turned off while no one exists in the space, in a prolonged time period, the data collecting unit 100 can obtain the above-mentioned second environmental data by collecting massive environmental data for each of the environment scene states.

For example, the processing unit 200 is further configured to obtain a first eigenvalue parameter according to the first environmental data, to obtain a plurality of second eigenvalue parameters of the conference room at different environment scene states according to the second environmental data, and to determine the environment scene state of the current environment in the conference room by comparing the first eigenvalue parameter and the plurality of second eigenvalue parameters.

As mentioned above, the second environmental data include a plurality of environmental data ranges, each of the environmental data ranges corresponds to one of the environment scene states, and the plurality of second eigenvalue parameters of the conference room at different environment scene states can be obtained according to the second environmental data, in which each of the second eigenvalue parameters is a numerical range, that is, each of the numerical ranges corresponds to one of the environment scene states. Then, the environment scene state of the current environment in the conference room can be determined by determining that the first eigenvalue parameter is within the numerical range of which second eigenvalue parameter.

Figure 5:
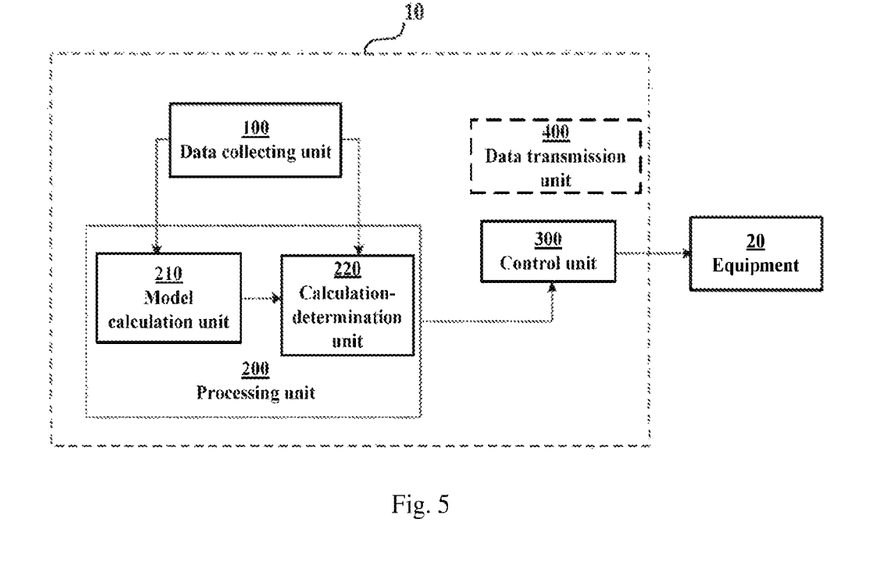
FIG. 5 is a schematic block diagram of an equipment regulation device provided by another example in an embodiment of the present disclosure.

For example, in some examples, as illustrated in FIG. 5, the processing unit 200 includes a model calculation unit 210 and a calculation-determination unit 220.

For example, the model calculation unit 210 is configured to perform data modeling according to the second environmental data to obtain a mathematical model, and to obtain the plurality of second eigenvalue parameters of the conference room at different environment scene states according to the mathematical model, and to store the plurality of second eigenvalue parameters into the calculation-determination unit 220.

For example, the calculation-determination unit 220 is configured to calculate the first environmental data according to the above-mentioned mathematical model to obtain the first eigenvalue parameter, and to determine the environment scene state of the current environment in the conference room by comparing the first eigenvalue parameter and the plurality of second eigenvalue parameters.

For example, the data modeling of the second environmental data can be performed through the following methods: firstly, discretizing a plurality of parameters of the second environmental data along the space and time; secondly, determining corresponding relationships between the plurality of parameters which are discretized; lastly, calculating the plurality of parameters of the second environmental data according to the corresponding relationships.

For example, the temporal and spatial distribution of physical quantity (for example, the velocity field and the pressure field of the air flow, and so on) in the region to be analyzed can be obtained by performing the following processes: discretizing continuous parameters (for example, parameters includes velocity, density, pressure) to be numerical analyzed along the space and time; establishing algebraic equations describing the relationship between the above-mentioned discretized regions (for example, partial differential equations) according to control equations (for example, the control equations includes Euler equation and so on) which need to be satisfied by the parameters; obtaining approximate values of the parameters through solving equations.

For example, in some examples, the mathematical model can adopt a zero equation model, and the zero equation model satisfies the following equation: $\mu=0.03874\rho vl$, in which $\mu$ is a turbulence viscosity coefficient, p is an air density (unit: $kg/m^3$), v is an air flow velocity (unit: m/s), and 1 is the minimum distance between the data collecting unit and the wall of the conference room (unit: m). For example, as illustrated in FIG. 3, 1 represents the distance between the sensor 110 and the wall A of the conference room.

In some examples, the air flow state data include the air density data, the air flow velocity data and the distance data. It should be noted that, the embodiments of the present disclosure include the above-mentioned case but are not limited to the above-mentioned case. It should be understood that, the air flow state data correspondingly include the data represented by the variables in other mathematical model in the case that other mathematical model is adopted.

For example, the air flow state data can be obtained through the sensors 110 as illustrated in FIG. 2 and FIG. 3. For example, a plurality of sub-sensors can be integrated in each of the sensors 110 to respectively sense the air density, the air flow velocity and the distance to the wall A of the conference room. Apparently, the distance 1 can also be obtained through manual measurement in advance instead of through the sensor.

For example, as illustrated in FIG. 5, the data collecting unit 100 collects massive second environmental data of the conference room at different environment scene states according to the first frequency and stores the second environmental data into the model calculation unit 210. The model calculation unit 210 classifies the second environmental data according to the environment scene state under which the data are collected, and then performs data modeling to obtain a mathematical model, for example, the zero equation model as mentioned above is obtained. By calculating u values in different environment scene states according to the mathematical model, a u value range corresponding to each of the environment scene states can be obtained, and a plurality of u value ranges corresponding to the plurality of environment scene states are the plurality of second eigenvalue parameters. In the case that the environmental arrangement of the conference room does not change and the data volume of the second environmental data is sufficiently large, the second eigenvalue parameters tend to be stable, and the stabilized second eigenvalue parameters are sent to the calculation-determination unit 220. The time period for sending the second eigenvalue parameters to the calculation-determination unit 220 can set to be relatively long, for example, the time period can set to be one day, one week or one month, and the time period can also be set according to actual implementations. Furthermore, the model calculation unit 210 can also send the mathematical model obtained by the data modeling to the calculation-determination unit 220 when sending the second eigenvalue parameters.

It should be noted that, manual classification of the second environmental data is needed during the initial stage of the data modeling of the model calculation unit 210, that is, the model calculation unit 210 needs to be informed with the information that which environment scene state the current environment scene state belongs to. After the data modeling of the model calculation unit 210 is finished, auto classification of the second environmental data received can be realized through self-learning, and the second eigenvalue parameters can be continuously improved through machine learning.

For example, the environmental data of current moment, that is, the first environmental data, can be sent to the calculation-determination unit 220 when the data collecting unit 100 collects the second environmental data of the conference room according to the first frequency. The calculation-determination unit 220 can obtain the first eigenvalue parameter through calculating the first environmental data according to the above-mentioned mathematical model obtained, and then determination of which second eigenvalue parameter the first eigenvalue parameter belongs can be realized by comparing the first eigenvalue parameter and the plurality of second eigenvalue parameters, such that the current environment scene state of the conference room can be determined.

For example, in some examples of the embodiments of the present disclosure, the processing unit 200 is further configured to determine whether or not the second environmental data of the space is changed, and to update the plurality of second eigenvalue parameters according to the second environmental data when the second environmental data is changed.

For example, as illustrated in FIG. 5, in the case that the processing unit 200 includes the model calculation unit 210 and the calculation-determination unit 220, when the second environmental data is changed, for example, the environmental arrangement inside the conference room is changed (for example, a plurality of potted plants is newly provided in the conference room at a pre-determined moment; for another example, the arrangement of the equipment in the conference room is changed at a pre-determined moment, and so on), the mathematical model of the model calculation unit 210 can update the plurality of second eigenvalue parameters, through machine learning, according to the changed second environmental data. For example, the model calculation unit 210 can be set to immediately send the updated second eigenvalue parameters to the calculation-determination unit 220 after the plurality of second eigenvalue parameters are updated.

For example, in some examples of the embodiments of the present disclosure, as illustrated in FIG. 5, the equipment regulation device 10 can further include a data transmission unit 400.

For example, the processing unit 200 is further configured to determine whether or not the environment scene state of the current environment in the space is changed, and to generate a state change signal in a case that the environment scene state of the current environment in the space is changed.

For example, for the calculation-determination unit 220, the calculation-determination unit 220 can further determine whether or not the current environment scene state is changed compared with the environment scene state at a previous moment, after the current environment scene state is determined by comparing the first eigenvalue parameter and the second eigenvalue parameters, and the calculation-determination unit 220 generates a state change signal if the determination result is positive. For example, the state change signal is an equipment turn-on signal in the case that the state that no one exists in the space is changed into the state that someone exists in the space; for another example, the state change signal is an equipment turn-off signal in the case that the state that someone exists in the space is changed into the state that no one exists in the space. It should be noted that, the state that no one exists in the space here can include the state that the air conditioner is turned on while no one exists in the space and the state that the air conditioner is turned off while no one exists in the space.

For example, the data transmission unit 400 is configured to transmit the state change signal to the control unit 300, so as to allow the control unit 300 to control one or more equipment in the space 20 to perform a state change according to the state change signal. For example, the state change signal can be sent to the equipment to be controlled through the switch controller 310. For example, if the equipment 20 to be controlled is already in the state corresponding to the state change signal, the equipment 20 does not respond to the state change signal this time.

In the examples of the present disclosure, corresponding state change signal is generated only when the processing unit 200 determines that the environment scene state is changed, and then the state change signal is sent to the equipment 20 through the control unit 300, such that turning on or turning off operations can be correspondingly performed with respect to the equipment 20. By adopting the above-mentioned method, electrical energy can be further saved and waste of resources can be further reduced.

For example, the transmission mode of the data transmission unit 400 can adopt a transmission mode based on a wireless network, a Bluetooth, an infrared or radio frequency. Apparently, in addition to wireless transmission modes, wired transmission modes can also be adopted. For example, in addition to data transmission between the processing unit 200 and the control unit 300, the data transmission unit 400 can further be used to transmit data between the data collecting unit 100 and the processing unit 200.

For example, the data transmission unit 400 can be specifically implemented as a plurality of data transmission sub-units, and each of the data transmission sub-units, for example, can be a wireless network communication module. The plurality of wireless network communication modules can be respectively provided in the data collecting unit 100, the model calculation unit 210, the calculation-determination unit 220 and the control unit 300, so as to realize data transmissions among the above-mentioned units.

For example, in some examples of the embodiments of the present disclosure, in the case that the processing unit 200 determines that the environment scene state of the current environment in the space is changed, if the environment scene state is changed from the state that no one exists in the space into the state that someone exists in the space, the processing unit 200 stops determining the environment scene state of the current environment in the space, and restarts determination after waiting for a first time interval.

For example, in the case that a conference room is changed from the state that no one exists in the space into the state that someone exists in the space, for example, after entering a conference process, the conference room is maintained to be in the state that someone exists in the space for a certain period of time, and in this case, continuous determination of the current environment scene states is not necessary. For example, the first time is 5 minutes, 10 minutes, 15 minutes or 20 minutes and so on, the embodiments of the present disclosure include the above-mentioned cases but are not limited to the above-mentioned cases, and the first time can be set according to actual implementation. By allowing the processing unit 200 to restart determination after waiting for the first time interval, the power consumption of the equipment regulation device 10 can be further reduced and the electrical energy can be further saved.

If the environment scene state is changed from the state that someone exists in the space into the state that no one exists in the space, the processing unit 200 continues to determine the environment scene state of the current environment in the space. For example, after the conference is finished, the conference room is changed from the state that someone exists in the space into the state that no one exists in the space, and in this case, the processing unit 200 needs to continue to determine the environment scene state in the conference room, so as to allow related equipment in the conference room to be turned on in time in the case that the conference room is changed into the state that someone exists in the space.

In the embodiments of the present disclosure, the model calculation unit 210 and the calculation-determination unit 220 can be respectively realized by an application-specific integrated circuit chip, and can also be respectively realized by a circuit, or realized by a software, a hardware (circuit), a firmware or any combination thereof.

For another example, the model calculation unit 210 and the calculation-determination unit 220 can include a processor and a memory. In the embodiments of the present disclosure, the processor can process the first environmental data and the second environmental data, and can include various computing architectures, for example, a complex instruction set computer (CISC) architecture, a reduced instruction set computer (RISC) architecture, or a structure that implements a combination of a plurality of instruction sets. In some embodiments, the processor can also be a microprocessor, for example, an X86 processor or an ARM processor, or can be a digital processor (DSP), etc. The processor can control other components to execute desired functions. In the embodiments of the present disclosure, the memory can store the instructions and/or the data executed by the processor. For example, the memory can include one or more computer program products, and the computer program products can include computer readable storage media in various forms, for example, a volatile memory and/or a non-volatile memory. The volatile memory, for example, can include a random access memory (RAM) and/or a cache, etc. The non-volatile memory, for example, can include a read-only memory (ROM), a hard disk, a flash memory, etc. One or more computer program instructions can be stored on the computer readable storage medium. The processor can run the program instructions to realize (realized by the processor) desired functions in the embodiment of the present disclosure. The computer readable storage medium can also store various other application programs and various data, for example, various data applied to and/or generated by the application programs.

For example, in some embodiments, the model calculation unit 210 and the calculation-determination unit 220 can be implemented as two distinct devices. For example, massive data calculation needs to be conducted by the model calculation unit 210 during operation, and the model calculation unit 210 can be implemented as a computer with strong computing capability, such as a server or a workstation, so as to guarantee the timeliness and stability of the data modeling. For example, the data volume which needs to be processed by the calculation-determination unit 220 during operation is relatively small, and thus the calculation-determination unit 220 can be implemented as an ordinary computer or a dedicated computation device.

For another example, in some embodiments, the model calculation unit 210 and the calculation-determination unit 220 can be implemented into a single device, that is, integrated in a single device and therefore, respective and separate setting is not needed.

For example, the processing unit 200 can be provided in the conference room; for another example, the processing unit 200 can also be provided in other places other than the conference room, or be provided in a cloud terminal. No limitation will be given to the embodiments of the present disclosure in this respect, as long as the data transmissions among the processing unit 200, the data collecting unit 100 and the control unit 300 are maintained to be stabilized.

Figure 6:
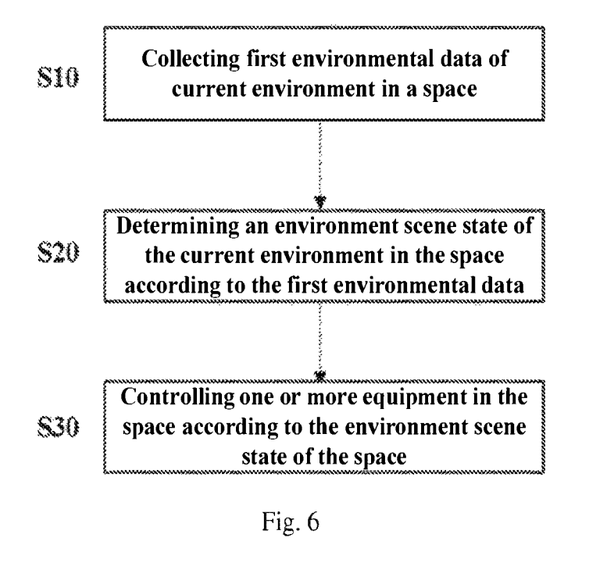
FIG. 6 is a schematic diagram of an equipment regulation method provided by an example in an embodiment of the present disclosure.

The embodiments of the present disclosure further provide an equipment regulation method, as illustrated in FIG. 6, the method includes the following operations.

Step S10: collecting a first environmental data of a current environment in a space.

Step S20: determining an environment scene state of the current environment of the space according to the first environmental data.

Step S30: controlling one or more equipment in the space according to the environment scene state of the space.

For example, as illustrated in FIG. 1, the step S10 can be executed by adopting the data collecting unit 100, the step S20 can be executed by adopting the processing unit 200, and the step S30 can be executed by adopting the control unit 300.

For example, the equipment regulation method can be applied in spaces such as a conference room, a safe, a cold storage or a file room, and the embodiments of the present disclosure include the above-mentioned cases but are not limited to the above-mentioned cases, the equipment regulation method provided by the embodiments of the disclosure can also be applied in any space, as long as the internal environment scene state of the space needs to be detected and one or more equipment in the space needs to be controlled according to the environment scene state.

For example, the first environmental data can include air flow state data. For example, the environment scene state can include a state that someone exists in the space and a state that no one exists in the space, in which the state that no one exists in the space can further include a state that an air conditioner is turned on while no one exists in the space and a state that the air conditioner is turned off while no one exists in the space.

For example, in the case that the equipment regulation method is applied in the conference room, the equipment in the step S30 can be at least one of a lamp, an air conditioner, a projector, a television, a writing board or a video conference equipment. It should be noted that, the embodiments of the present disclosure include the above-mentioned cases but are not limited to the above-mentioned cases. For example, if the equipment regulation method is applied in other application scenarios, for example, a file room, the equipment in the step S30 is correspondingly the equipment which is in the file room and needs to be controlled.

For example, in the step S10, the first environmental data can be collected by adopting the sensors 110 as illustrated in FIG. 2 and FIG. 3, the descriptions and the arrangements of the sensors 110 can refer to related descriptions in the above-mentioned embodiments, and no further descriptions will be given here.

For example, in the case that the equipment regulation method is applied in the conference room, if the current environment scene state of the conference room is the state that no one exists in the space, the equipment in the conference room can be controlled to be turned off. For example, the lamp, the air conditioner, the projector, the television, the writing board and the video conference equipment and so on can be controlled to be turned off. Apparently, one or more equipment in the above-mentioned equipment can already be turned off, and the equipment can be unresponsive in this case. For example, if the current environment scene state of the conference room is the state that someone exists in the space, the equipment in the conference room can be controlled to be turned on.

By implementing the equipment regulation method provided by the present embodiment, the operation state of the equipment in the space can be controlled according to the environment scene state in the space, and therefore, electrical energy can be saved, waste of resources can be reduced, and safety factor can be improved.

Figure 7:
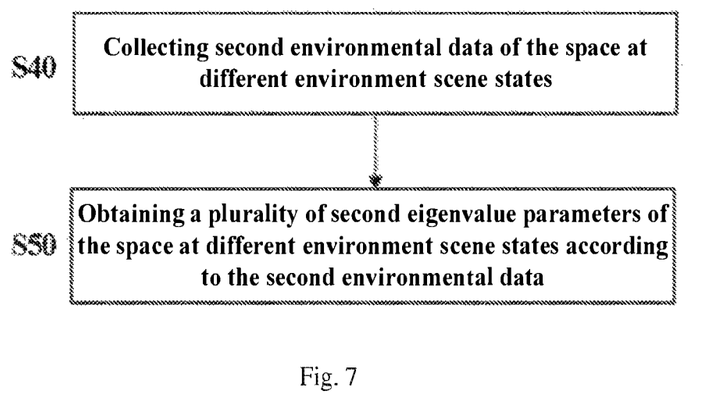
FIG. 7 is a schematic diagram of an equipment regulation method provided by another example in an embodiment of the present disclosure.

In some embodiments of the present disclosure, as illustrated in FIG. 7, the equipment regulation method can further include the following operations.

Step S40: collecting second environmental data of the space at different environment scene states.

Step S50: obtaining a plurality of second eigenvalue parameters of the space at different environment scene states according to the second environmental data.

For example, the step S40 can be executed by adopting the data collecting unit 100, and the step S50 can be executed by adopting the processing unit 200.

Figure 8:
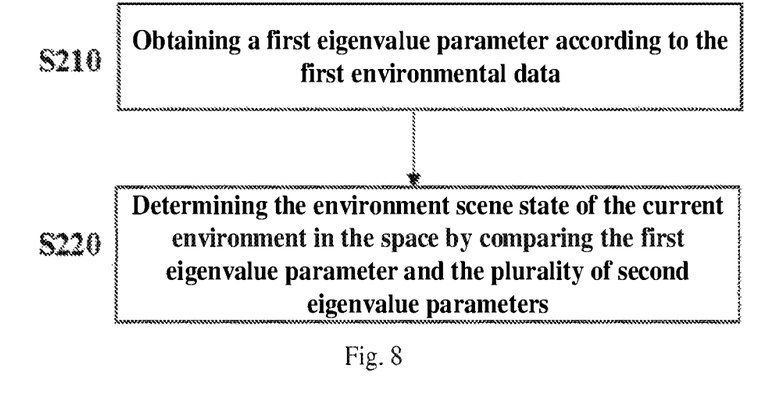
FIG. 8 is a schematic diagram of a specific example of step S20 in FIG. 6.

In some embodiments of the present disclosure, as illustrated in FIG. 8, the above-mentioned step S20 can include the following operations.

Step S210: obtaining a first eigenvalue parameter according to the first environmental data.

Step S220: determining the environment scene state of the current environment in the space by comparing the first eigenvalue parameter and the plurality of second eigenvalue parameters.

For example, the step S210 and the step S220 can be executed by adopting the processing unit 200.

Specifically, the data collecting unit 100 can be adopted to collect the second environmental data of the conference room at different environment scene states according to a first frequency. For example, the first frequency can include 1 Hz, 5 Hz, 10 Hz, 20 Hz or 50 Hz, the embodiments of the present disclosure include the above-mentioned cases but are not limited to the above-mentioned cases, and the first frequency can be specifically set according to actual implementations. For example, the second environmental data can also be the air flow state data, just like the first environmental data.

It should be noted that, regarding the first environmental data and the second environmental data, related descriptions as mentioned above can be referred, and no further descriptions will be given here.

As mentioned above, the second environmental data include a plurality of environmental data ranges, each of the environmental data ranges corresponds to one of the environment scene states, and the plurality of second eigenvalue parameters of the conference room at different environment scene states can be obtained according to the second environmental data, in which each of the second eigenvalue parameters is a numerical range, that is, each of the numerical ranges corresponds to one of the environment scene states. Then, the environment scene state of the current environment in the conference room can be determined by determining that the first eigenvalue parameter is within the numerical range of which second eigenvalue parameter.

For example, in some examples, the above-mentioned step S50 can include the following operations.

Step S51: performing data modeling on the second environmental data to obtain a mathematical model; and Step S52: obtaining the second eigenvalue parameters according to the mathematical model.

For example, the above-mentioned step S210 can include: calculating the first environmental data according to the above-mentioned mathematical model to obtain the first eigenvalue parameter.

For example, the data modeling of the second environmental data can be performed through the following methods: firstly, discretizing a plurality of parameters of the second environmental data along the space and time; secondly, determining corresponding relationships between the plurality of parameters which are discretized; lastly, calculating the plurality of parameters of the second environmental data according to the corresponding relationships.

For example, the temporal and spatial distribution of physical quantity (for example, the velocity field and the pressure field of the air flow, and so on) in the region to be analyzed can be obtained by performing the following processes: discretizing continuous parameters (for example, parameters includes velocity, density, pressure) to be numerical analyzed along the space and time; establishing algebraic equations describing the relationship between the above-mentioned discretized regions (for example, partial differential equations) according to control equations (for example, the control equations includes Euler equation and so on) which need to be satisfied by the parameters; obtaining approximate values of the parameters through solving equations.

For example, in some examples, the mathematical model can adopt a zero equation model, and the zero equation model satisfies the following equation: $\mu=0.03874\rho v l$, in which $\mu$ is a turbulence viscosity coefficient, $\rho$ is an air density (unit: $kg/m^3$), v is an air flow velocity (unit: m/s), and l is the minimum distance between the data collecting unit and the wall of the conference room (unit: m). For example, as illustrated in FIG. 3, l represents the distance between the sensor 110 and the wall A of the conference room. In some examples, the air flow state data include the air density data, the air flow velocity data and the distance data.

For example, massive second environmental data of the conference room at different environment scene states are collected according to the first frequency, the second environmental data are classified according to the environment scene state under which the data are collected, and a mathematical model is obtained through data modeling, for example, the zero equation model as mentioned above is obtained. By calculating $\mu$ values in different environment scene states according to the mathematical model, a $\mu$ value range corresponding to each of the environment scene states can be obtained, and a plurality of $\mu$ value ranges corresponding to the plurality of environment scene states are the plurality of second eigenvalue parameters. In the case that the environmental arrangement of the conference room does not change and the data volume of the second environmental data is sufficiently large, the second eigenvalue parameters tend to be stable.

For example, the environmental data of current moment, that is, the first environmental data, can be collected when collecting the second environmental data of the conference room according to the first frequency. The first eigenvalue parameter can be obtained through calculating the first environmental data according to the above-mentioned mathematical model obtained, and then determination of which second eigenvalue parameter the first eigenvalue parameter belongs can be realized by comparing the first eigenvalue parameter and the plurality of second eigenvalue parameters, such that the current environment scene state of the conference room can be determined.

For example, in some examples of the embodiments of the present disclosure, the equipment regulation method further includes: determining whether or not the second environmental data of the space is changed and updating the plurality of second eigenvalue parameters according to the second environmental data when the second environmental data is changed.

For example, in the case that the second environmental data is changed, for example, the environmental arrangement inside the conference room is changed (for example, a plurality of potted plants is newly provided in the conference room at a pre-determined moment; for another example, the arrangement of the equipment in the conference room is changed at a pre-determined moment, and so on), the mathematical model can update the plurality of second eigenvalue parameters, through machine learning, according to the changed second environmental data.

For example, in some examples of the embodiments of the present disclosure, the above-mentioned step S20 can further include: determining whether or not the environment scene state of the current environment in the space is changed, and generating a state change signal if a determination result is positive. The above-mentioned step S30 can further include: transmitting the state change signal to one or more equipment in the space to control the equipment to perform a state change.

For example, after the step S220 is finished, that is, after the current environment scene state is determined by comparing the first eigenvalue parameter and the second eigenvalue parameters, whether or not the current environment scene state is changed compared with the environment scene state at a previous moment can be further determined, and a state change signal is generated if a determination result is positive. For example, the state change signal is an equipment turn-on signal in the case that the state that no one exists in the space is changed into the state that someone exists in the space; for another example, the state change signal is an equipment turn-off signal in the case that the state that someone exists in the space is changed into the state that no one exists in the space. It should be noted that, the state that no one exists in the space here can include the state that the air conditioner is turned on while no one exists in the space and the state that the air conditioner is turned off while no one exists in the space.

In some examples, corresponding state change signal is generated only when it is determined that the environment scene state is changed, and the state change signal is sent to the equipment in the conference, such that turning on or turn off operations are correspondingly performed with respect to the equipment. By adopting the above-mentioned method, electrical energy can be further saved and waste of resources can be further reduced.

For example, in some examples of the embodiments of the present disclosure, in the case that the current environment scene state of the space is changed, if the environment scene state is changed from the state that no one exists in the space into the state that someone exists in the space, stopping the determining the environment scene state of the current environment in the space, and restarting the determination after waiting for a first time interval.

For example, in the case that a conference room is changed from the state that no one exists in the space into the state that someone exists in the space, for example, after entering a conference process, the conference room is maintained to be in the state that someone exists in the space for a certain period of time, and in this case, continuous determination of the current environment scene states is not necessary. For example, the first time is 5 minutes, 10 minutes, 15 minutes or 20 minutes and so on, the embodiments of the present disclosure include the above-mentioned cases but are not limited to the above-mentioned cases, and the first time can be set according to actual implementation. By restarting determination after waiting for the first time interval, the power consumption of the equipment regulation device 10 can be further reduced and the electrical energy can be further saved.

If the environment scene state is changed from the state that someone exists in the space into the state that no one exists in the space, determination of the environment scene state of the current environment in the space is continued. For example, after the conference is finished, the conference room is changed from the state that someone exists in the space into the state that no one exists in the space, and in this case, determination of the environment scene state in the conference room needs to be continued, so as to allow related equipment in the conference room to be turned on in time in the case that the conference room is changed into the state that someone exists in the space.

Figure 9:
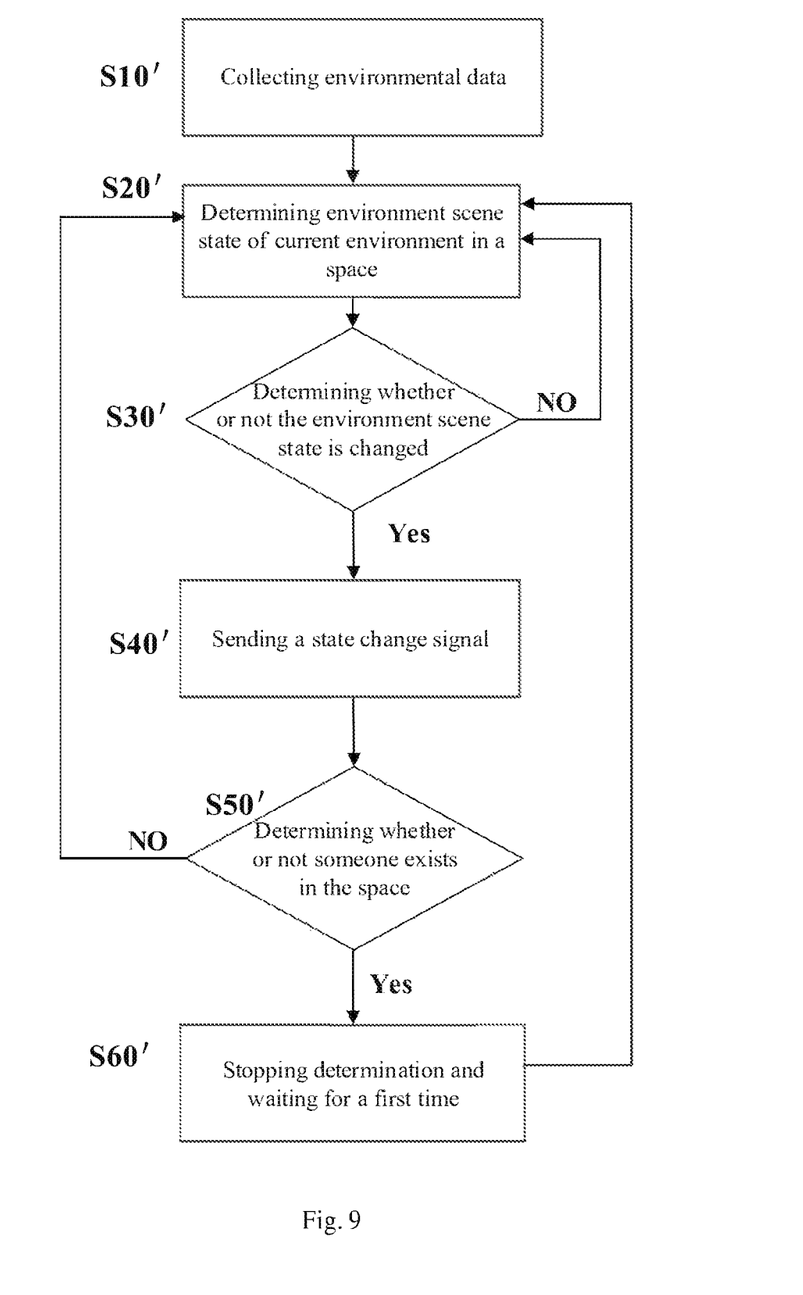
FIG. 9 is schematic flow chart of an equipment regulation method provided by an embodiment of the present disclosure.

For example, FIG. 9 is a schematic diagram of a flow chart of an equipment regulation method provided by the embodiments of the present disclosure, and the equipment regulation method includes the following operations.

Step S10': collecting environmental data;
Step S20': determining environment scene state of current environment in a space;
Step S30': determining whether or not the environment scene state is changed;
Step S40': sending a state change signal;
Step S50': determining whether or not someone exists in the space; and
Step S60': stopping determination and waiting for a first time.

For example, in the step S10', the environmental data include a first environmental data and a second environmental data, the second environmental data can be used to perform data modeling to obtain a mathematical model, and a first eigenvalue parameter and second eigenvalue parameters can be obtained according to the mathematical model.

In the step S20', the environment scene state of the current environment in the space can be determined according to the first eigenvalue parameter and the second eigenvalue parameters.

In the step S30', whether or not the environment scene state in the space is changed can be determined according to the environment scene state of current environment and the environment scene state at a previous moment, a state change signal is generated and the step S40' is executed if the determination result is positive, and the method is returned to execute the step S20' if the determination result is negative.

In the step S40', the state change signal is sent to the equipment to be controlled in the space.

In the step S50', in the case that it is determined that the environment scene state is changed, determination of whether or not someone exists in the space is continued, the step S60' is executed if the determination result is positive, and the method is returned to execute the step S20' if the determination result is negative.

In the step S60', determination operations are stopped, and the method is returned to execute the step S20' after waiting for the first time.

Figure 10:
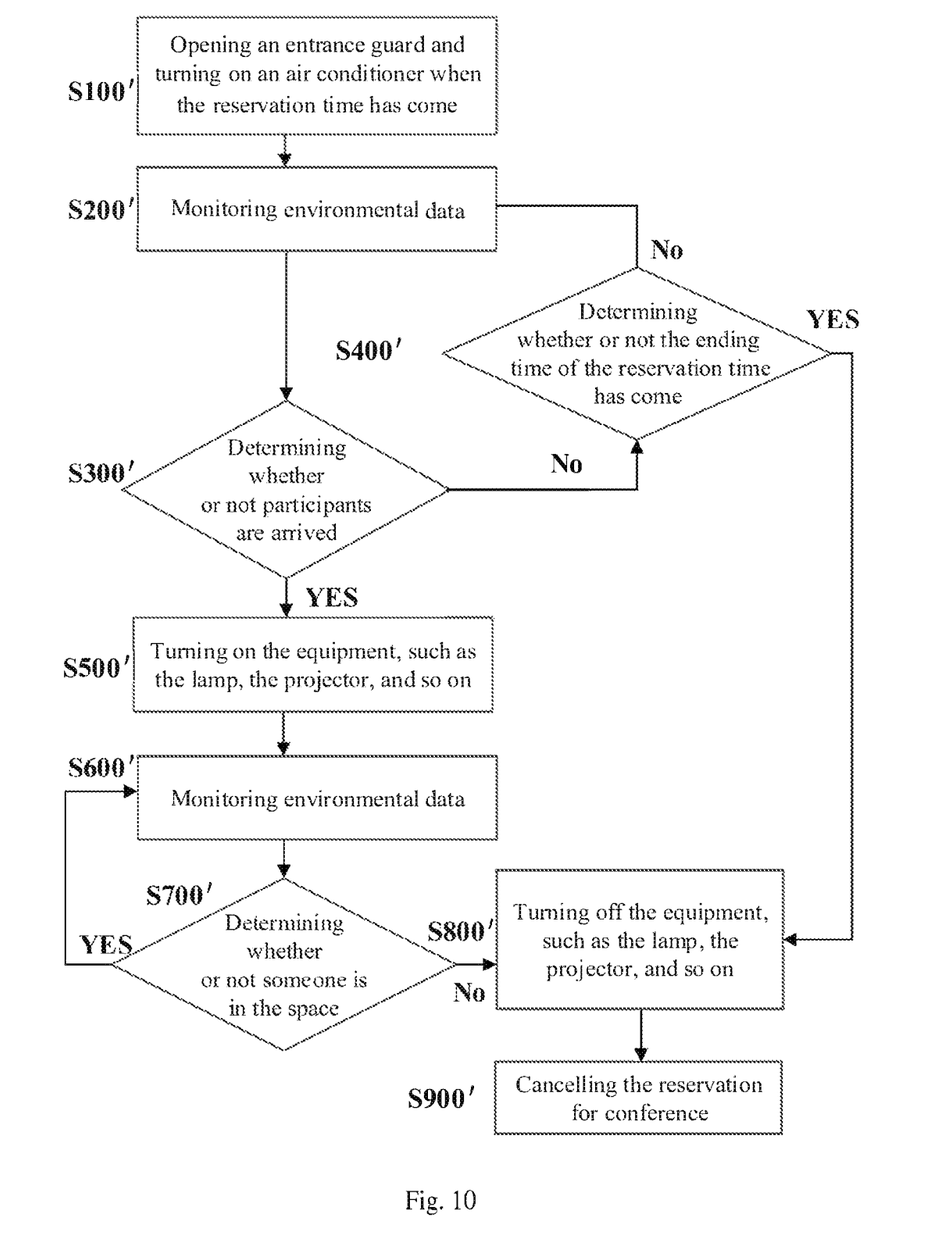
FIG. 10 is a schematic flow chart illustrating application of an equipment regulation method provided by an embodiment of the present disclosure in a conference room reservation system.

By executing the equipment regulation method provided by the present embodiment, a state change signal can be sent to the equipment in the space when the environment scene state in the space is changed, so as to turn on or turn off the equipment. In the case that it is determined that someone is in the space, determination steps can be temporally stopped, and the determination steps restart after waiting for a certain time. By adopting the method, electrical energy can be saved, and waste of resources can be reduced. For example, the equipment regulation method provided by the embodiments of the present disclosure can be applied in the conference room reservation processes, and FIG. 10 is a specific schematic flow chart.

In step S100', a system opens an entrance guard and turns on an air conditioner when the reservation time has come. For example, the air conditioner can also be turned on in advance for a certain time, by this way, the conference room can have a comfortable ambient temperature in advance.

In step S200', environmental data are monitored. For example, monitoring of the environmental data can include: collecting the environmental data of the conference room, and determining the environment scene state in the conference room.

In step S300', whether or not participants are arrived is determined, that is, whether or not someone is in the conference room is determined, step S500' is executed if the determination result is positive, and step S400' is executed if the determination result is negative.

In the step S400', whether or not the ending time of the reservation time has come is determined, and it is determined that the participants are not arrived at the conference room and step S800' is executed if the determination result is positive; the method is returned execute the step S200', that is, monitoring of the environmental data is continued, if the determination result is negative.

In the step S500', after the participants are arrived at the conference room, the system turns on the equipment, such as the lamp, the projector, and so on in the conference room by controlling the equipment.

Step S600' is the same as the step S200', and monitoring of the environmental data is continued.

In step S700', whether or not someone is in the space is determined, that is, the step is intended for determining whether or not the conference is finished and whether or not the participants leave the conference room. The method returns to execute the step S600' if it is determined that someone is in the room, and the method executes the step S800' if it is determined that no one is in the room.

In the step S800', the equipment, such as the air conditioner, the lamp, the projector and so on, in the conference room are turned off.

In step S900', the reservation for conference is cancelled, that is to say, the conference in the conference room is finished at this moment, and other people can reserve the conference room.

Waste of resources with respect to the conference room can be occurred frequently during using the conference room. For example, reservation of the conference room without using the conference room can cause other people unable to reserve the conference room. For example, the use time for the conference room can be far less than the length of reserved time. For another example, the equipment in the conference room can forget to be turned off after the conference is finished.

By adopting the conference room reservation processes as illustrated in FIG. 10, the waste of resources with respect to the conference room can be solved with relatively good effect. For example, if reservation of the conference room without using the conference room is occurred, the system can determine that the conference room is in the state that no one exists in the conference room and the reservation of the conference room can be cancelled. For example, for the case where the conference is finished before the ending time of the reservation, the system can also determine that the conference room in the state that no one exists in the conference room and cancel the reservation of the conference room in advance. For another example, in the case that the conference is finished, and the staffs forget to turn off one or more equipment in the conference room, the equipment can be controlled to be turned off after the system determines that the conference room is in the state that no one exists in the conference room. By adopting the equipment regulation method in the embodiments of the present disclosure, inefficiently occupying of the conference room can be solved, and the cost of enterprise management can be reduced.

It should be noted that, the equipment regulation method provided by the embodiments of the present disclosure can further be applied in other relatively enclosed space, in which whether or not someone is in the enclosed space needs to be determined, for example, the enclosed space can be the safe, the cold storage or the file room, and so on, and no limitations will be given to the present in this respect.

What are described above are specific implementations of the disclosure, but the scopes of the disclosure are not limited to the above-mentioned implementations, and the scopes of the disclosure are defined by the accompanying claims.

What is claimed is:

1. An equipment regulation method, comprising: collecting first environmental data of current environment in a space;
    determining an environment scene state of the current environment in the space according to the first environmental data;
    controlling by turning on or off one or more equipment in the space according to the environment scene state of the current environment in the space;
    wherein the determining the environment scene state of the current environment in the space according to the first environmental data comprises:
        obtaining a first eigenvalue parameter according to the first environmental data;
    collecting second environmental data of the space at different environment scene states;
    obtaining a plurality of second eigenvalue parameters of the space at the different environment scene states according to the second environmental data; and
    determining the environment scene state of the current environment in the space by comparing the first eigenvalue parameter and the plurality of second eigenvalue parameters,
    wherein the first environmental data include the environmental data under the current environment scene state, the second environmental data include the environmental data under a plurality of different environment scene states, the second environmental data include a plurality of environmental data ranges, and each of the plurality of second eigenvalue parameters includes a numerical range.

2. The equipment regulation method according to claim 1, further comprising:
    determining whether or not the second environmental data of the space is changed; and
    updating the plurality of second eigenvalue parameters according to the second environmental data in a case that the second environmental data of the space is changed.

3. The equipment regulation method according to claim 1, wherein the obtaining of the plurality of second eigenvalue parameters of the space at different environment scene states according to the second environmental data comprises:
    performing data modeling on the second environmental data to obtain a mathematical model; and
    obtaining the plurality of second eigenvalue parameters according to the mathematical model;
    wherein the obtaining of the first eigenvalue parameter according to the first environmental data comprises:
        calculating the first environmental data according to the mathematical model to obtain the first eigenvalue parameter.

4. The equipment regulation method according to claim 3, wherein the performing of the data modeling on the second environment data to obtain the mathematical model comprises:
    discretizing a plurality of parameters of the second environmental data along a space and a time;
    determining corresponding relationships between the plurality of parameters which are discretized; and
    calculating approximate values of the plurality of parameters of the second environmental data according to the corresponding relationships.

5. The equipment regulation method according to claim 3, wherein the mathematical model comprises:

$$\mu=0.03874\rho v l;$$

wherein $\mu$ is a turbulence viscosity coefficient, $\rho$ is an air density, $v$ is an air flow velocity; and $l$ is a minimum distance between an inner surface of the space and a position at which the first environmental data or the second environmental data are collected.

6. The equipment regulation method according to claim 1, wherein the determining of the environment scene state of the current environment in the space according to the first environmental data further comprises:
    determining whether or not the environment scene state of the current environment in the space is changed, and generating a state change signal in a case that the environment scene state of the current environment in the space is changed; and the controlling of the equipment in the space according to the environment scene state of the space comprises:
transmitting the state change signal to the equipment in the space to control the equipment to perform a state change.

7. The equipment regulation method according to claim 6, wherein in a case that the environment scene state of the current environment in the space is changed, if the environment scene state is changed from a state that no one exists in the space into a state that someone exists in the space, stopping the determining the environment scene state of the current environment in the space, and restarting the determination after waiting for a first time interval; and if the environment scene state is changed from the state that someone exists in the space into the state that no one exists in the space, continuing the determining of the environment scene state of the current environment in the space.

8. The equipment regulation method according to claim 1, wherein the first environmental data or the second environmental data comprises air flow state data.

9. The equipment regulation method according to claim 8, wherein the air flow state data comprises air density data, air flow velocity data and distance data.

10. The equipment regulation method according to claim 1, wherein the first eigenvalue parameter or the second eigenvalue parameters each comprises a turbulence viscosity coefficient.

11. An equipment regulation device, comprising:
a data collecting unit configured to collect first environmental data of current environment in a space;
a processing unit configured to determine an environment scene state of the current environment in the space according to the first environmental data;
a control unit configured to control by turning on or off one or more equipment in the space according to the environment scene state of the current environment in the space;
wherein the data collecting unit is further configured to collect second environmental data of the space at different environment scene states according to a first frequency; and
the processing unit is further configured to obtain a first eigenvalue parameter according to the first environmental data, obtain a plurality of second eigenvalue parameters of the space at the different environment scene states according to the second environmental data, and to determine the environment scene state of the current environment in the space by comparing the first eigenvalue parameter and the plurality of second eigenvalue parameters,
wherein the first environmental data include the environmental data under the current environment scene state, the second environmental data include the environmental data under a plurality of different environment scene states, the second environmental data include a plurality of environmental data ranges, and each of the plurality of second eigenvalue parameters includes a numerical range.

12. The equipment regulation device according to claim 11, wherein the processing unit is further configured to determine whether or not the second environmental data of the space is changed, and to update the plurality of second eigenvalue parameters according to the second environmental data in a case that the second environmental data is changed.

13. The equipment regulation device according to claim 11, wherein the processing unit comprises a model calculation unit and a calculation-determination unit;

wherein the model calculation unit is configured to perform data modeling according to the second environmental data to obtain a mathematical model, and to obtain the plurality of second eigenvalue parameters of the space at different environment scene states according to the mathematical model, and to store the plurality of second eigenvalue parameters in the calculation-determination unit; and the calculation-determination unit is configured to calculate the first environmental data according to the mathematical model to obtain the first eigenvalue parameter, and to determine the environment scene state of the current environment in the space by comparing the first eigenvalue parameter and the plurality of second eigenvalue parameters.

14. The equipment regulation device according to claim 13, wherein the mathematical model comprises:

$$\mu=0.03874\rho v l;$$

wherein $\mu$ is a turbulence viscosity coefficient, $\rho$ is an air density, $v$ is an air flow velocity; and $l$ is a minimum distance between the data collecting unit and an inner surface of the space.

15. The equipment regulation device according to claim 11, further comprises a data transmission unit;

the processing unit is further configured to determine whether or not the environment scene state of the current environment in the space is changed, and to generate a state change signal in a case that the environment scene state of the current environment in the space is changed; and the data transmission unit is configured to transmit the state change signal to the control unit to allow the control unit to control the equipment in the space to perform a state change according to the state change signal.

16. The equipment regulation device according to claim 11, wherein in a case that the processing unit determines that the environment scene state of the current environment in the space is changed, if the environment scene state is changed from a state that no one exists in the space into a state that someone exists in the space, the processing unit stops determining the environment scene state of the current environment in the space, and restarts determination after waiting for a first time interval; and if the environment scene state is changed from the state that someone exists in the space into the state that no one exists in the space, the processing unit continues to determine the environment scene state of the current environment in the space.

* * * * *

UNITED STATES PATENT AND TRADEMARK OFFICE
CERTIFICATE OF CORRECTION

| | |
|---|---|
| PATENT NO. | : 11,662,697 B2 |
| APPLICATION NO. | : 16/318022 |
| DATED | : May 30, 2023 |
| INVENTOR(S) | : Xuefeng Kan |

It is certified that error appears in the above-identified patent and that said Letters Patent is hereby corrected as shown below:

In the Claims

In Column 22, Lines 49 and 50 (Lines 1 and 2 of Claim 16) please change, "The equipment regulation device according to claim 11, ..." to correctly read:
-- The equipment regulation device according to claim 15, ... --

Signed and Sealed this
Nineteenth Day of September, 2023

Katherine Kelly Vidal
*Director of the United States Patent and Trademark Office*